US012676982B2

(12) United States Patent
Wang

(10) Patent No.: US 12,676,982 B2
(45) Date of Patent: Jul. 7, 2026

(54) CODING A MERGED BLOCK THAT OVERLAPS A REFERENCE BLOCK IN INTRA BLOCK COPY MODE

(71) Applicant: Tencent Technology (Shenzhen) Company Limited, Shenzhen (CN)

(72) Inventor: Yingbin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 136 days.

(21) Appl. No.: 18/514,648

(22) Filed: Nov. 20, 2023

(65) Prior Publication Data

US 2024/0089457 A1 Mar. 14, 2024

Related U.S. Application Data

(63) Continuation of application No. PCT/CN2022/142701, filed on Dec. 28, 2022.

(30) Foreign Application Priority Data

Dec. 31, 2021 (CN) .......................... 202111671659.6

(51) Int. Cl.
H04N 19/00 (2014.01)
H04N 19/119 (2014.01)
(Continued)

(52) U.S. Cl.
CPC ......... *H04N 19/137* (2014.11); *H04N 19/119* (2014.11); *H04N 19/14* (2014.11); *H04N 19/176* (2014.11); *H04N 19/46* (2014.11)

(58) Field of Classification Search
None
See application file for complete search history.

(56) References Cited

U.S. PATENT DOCUMENTS

2015/0195526 A1* 7/2015 Zhu ........................ H04N 19/51
375/240.14
2016/0227244 A1* 8/2016 Rosewarne ............ H04N 19/70
(Continued)

FOREIGN PATENT DOCUMENTS

CN 105659602 A 6/2016
WO 2015/102975 A2 7/2015

OTHER PUBLICATIONS

International Search Report with Written Opinion issued Mar. 15, 2023 in Application No. PCT/US2022/142701. (20 pages).
(Continued)

*Primary Examiner* — Zhihan Zhou
(74) *Attorney, Agent, or Firm* — ArentFox Schiff LLP

(57) ABSTRACT

A coding block processing method includes receiving a bit stream, and determining, according to the bit stream, that a current coding block is coded in intra block copy mode, and that the current coding block overlaps a reference coding block. The method further includes, in response to the determination that the current coding block overlaps the reference coding block, determining that the current coding block is a merged block and partitioning the merged block into plural sub-blocks. The method further includes determining motion information of the plural sub-blocks based on one set of motion information indicated in the bit stream, such that the plural subblocks have the same motion information.

18 Claims, 8 Drawing Sheets

110

Receive a bit stream, and determine, according to the bit stream, a positional relationship between a current coding block and a reference coding block

120

Determine, when the positional relationship is overlapping, that the current coding block is a merged block

130

Partition the merged block to obtain a plurality of target coding blocks, the plurality of target coding blocks including same motion information

(51) Int. Cl.
  *H04N 19/137*   (2014.01)
  *H04N 19/14*    (2014.01)
  *H04N 19/176*   (2014.01)
  *H04N 19/46*    (2014.01)

(56)      References Cited

U.S. PATENT DOCUMENTS

2016/0241858 A1\* 8/2016 Li ......................... H04N 19/96
2016/0330471 A1\* 11/2016 Zhu ...................... H04N 19/91

OTHER PUBLICATIONS

Extended European Search Report received for European Patent Application No. 22914883.8, mailed on Mar. 10, 2025, 10 pages.
Office Action received for Japanese Patent Application No. 2024-506589, mailed on Jan. 7, 2025, 8 pages (4 pages of English Translation and 4 pages of Original Document).

\* cited by examiner

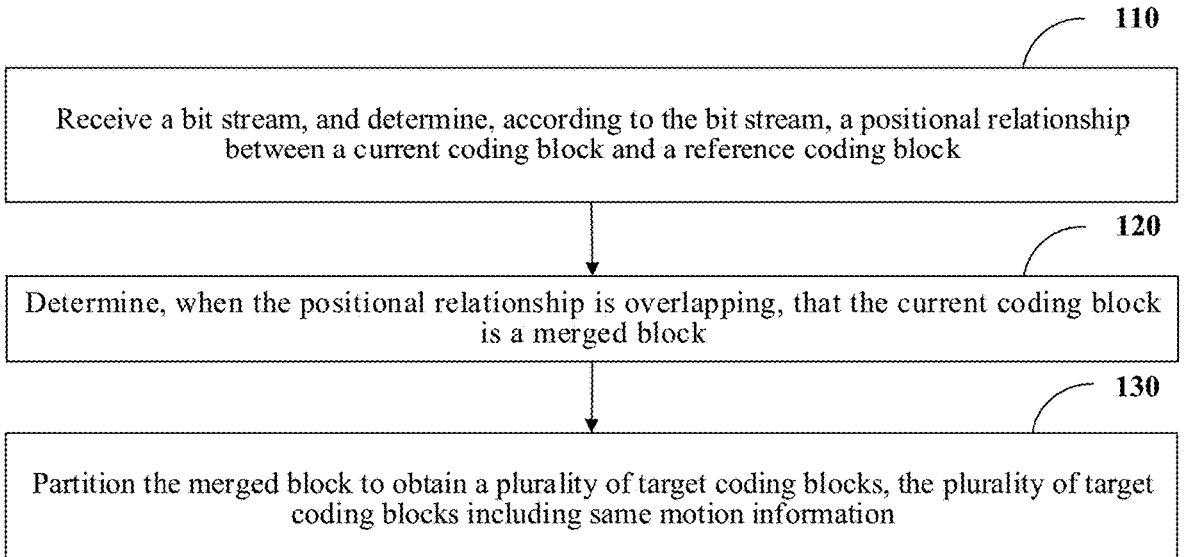

Receive a bit stream, and determine, according to the bit stream, a positional relationship between a current coding block and a reference coding block Determine, when the positional relationship is overlapping, that the current coding block is a merged block Partition the merged block to obtain a plurality of target coding blocks, the plurality of target coding blocks including same motion information

FIG. 1

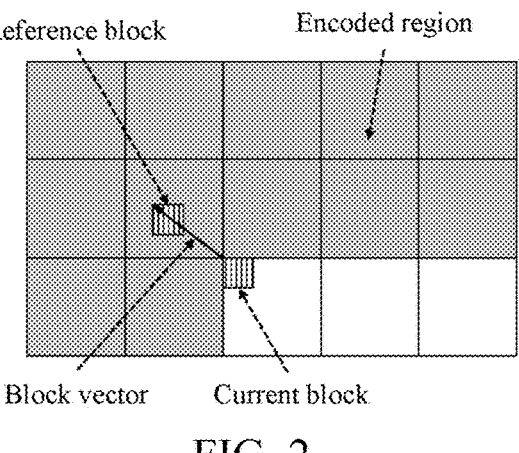

Reference block          Encoded region

Block vector          Current block

FIG. 2

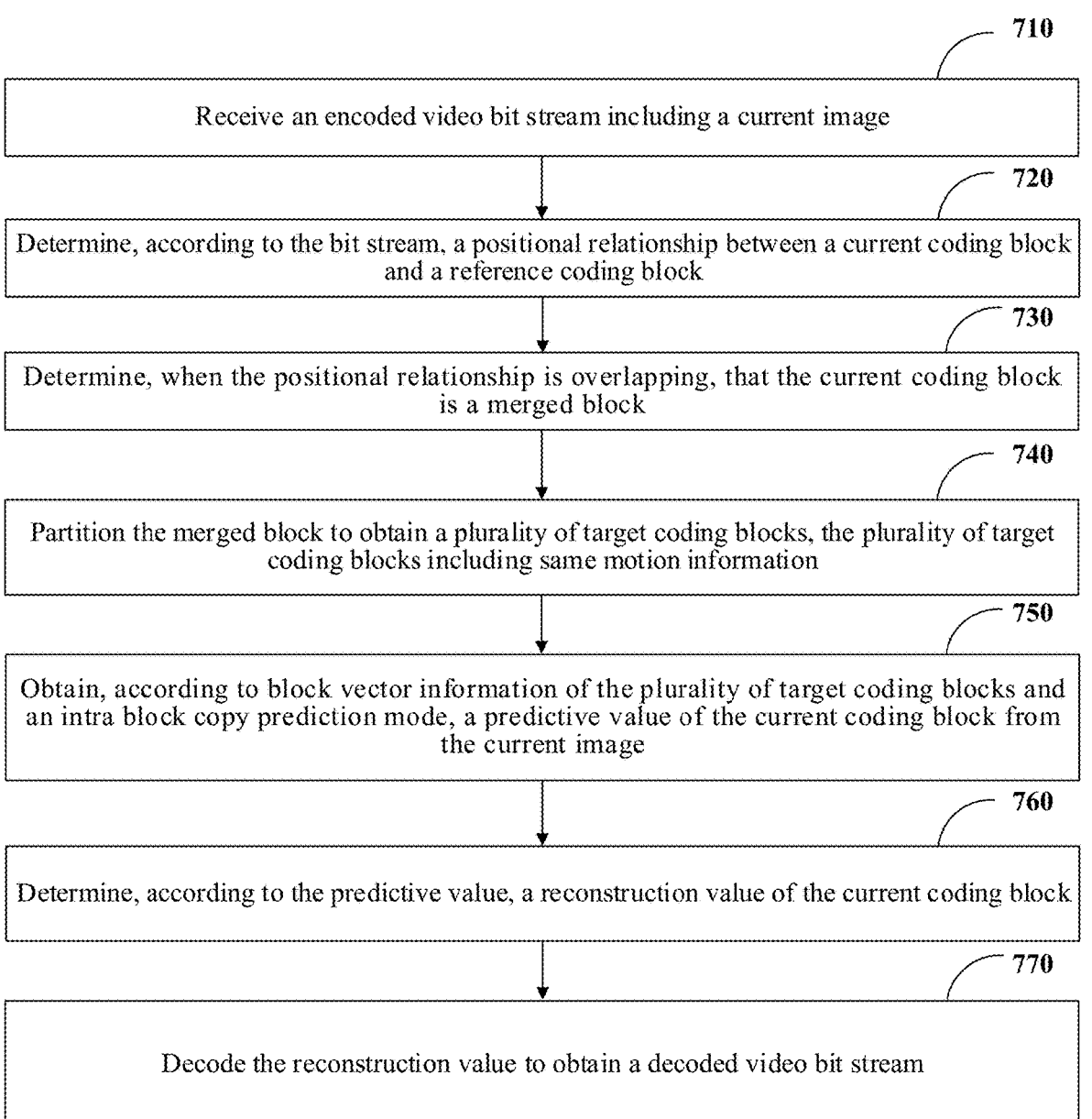

710

Receive an encoded video bit stream including a current image

720

Determine, according to the bit stream, a positional relationship between a current coding block and a reference coding block

730

Determine, when the positional relationship is overlapping, that the current coding block is a merged block

740

Partition the merged block to obtain a plurality of target coding blocks, the plurality of target coding blocks including same motion information

750

Obtain, according to block vector information of the plurality of target coding blocks and an intra block copy prediction mode, a predictive value of the current coding block from the current image

760

Determine, according to the predictive value, a reconstruction value of the current coding block

770

Decode the reconstruction value to obtain a decoded video bit stream

FIG. 7

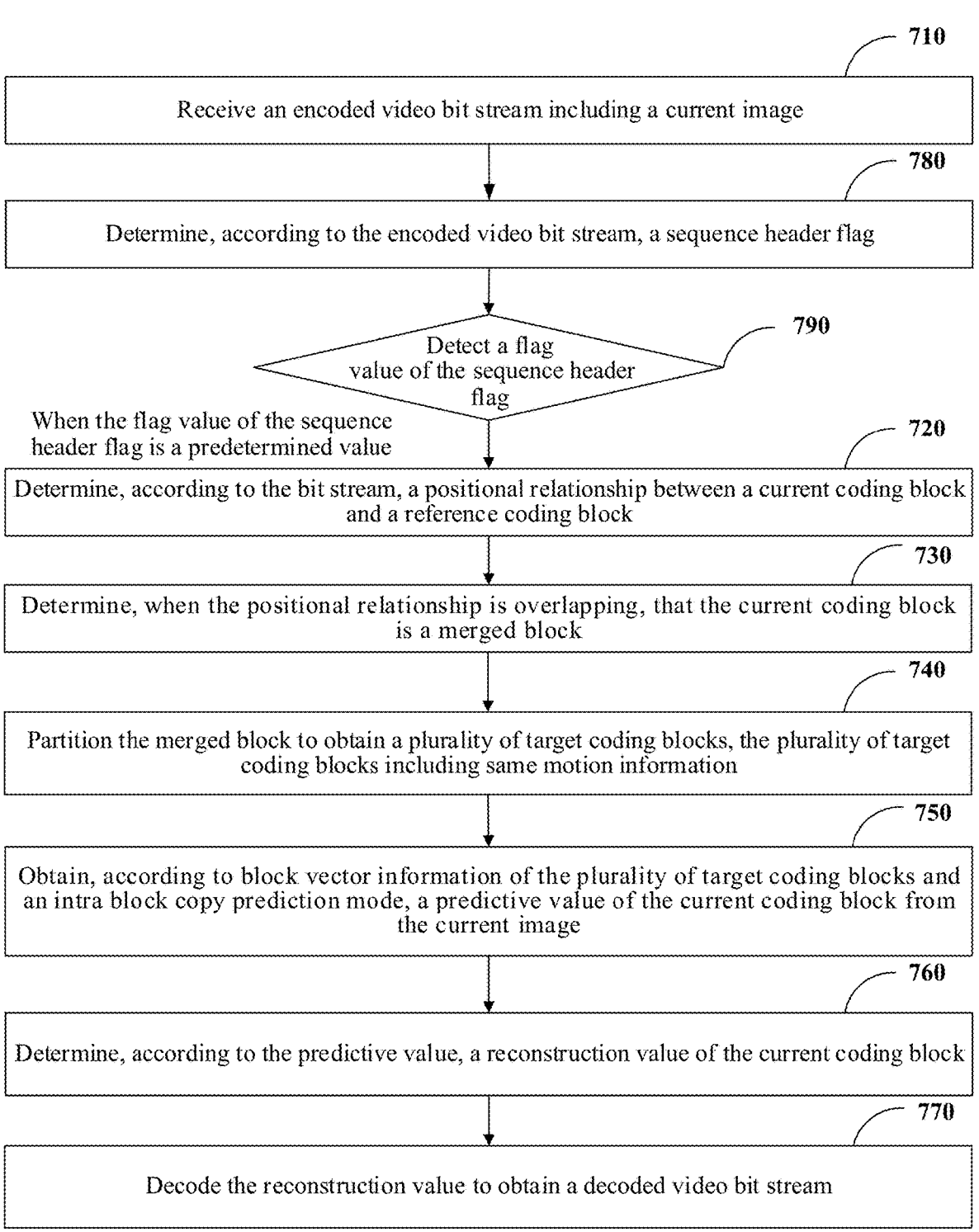

710

Receive an encoded video bit stream including a current image

780

Determine, according to the encoded video bit stream, a sequence header flag

790

Detect a flag value of the sequence header flag

When the flag value of the sequence header flag is a predetermined value

720

Determine, according to the bit stream, a positional relationship between a current coding block and a reference coding block

730

Determine, when the positional relationship is overlapping, that the current coding block is a merged block

740

Partition the merged block to obtain a plurality of target coding blocks, the plurality of target coding blocks including same motion information

750

Obtain, according to block vector information of the plurality of target coding blocks and an intra block copy prediction mode, a predictive value of the current coding block from the current image

760

Determine, according to the predictive value, a reconstruction value of the current coding block

770

Decode the reconstruction value to obtain a decoded video bit stream

FIG. 10

CODING A MERGED BLOCK THAT OVERLAPS A REFERENCE BLOCK IN INTRA BLOCK COPY MODE

RELATED APPLICATIONS

This application is a continuation of International Patent Application No. PCT/CN2022/142701, filed on Dec. 28, 2022, which claims priority to Chinese Patent Application No. 202111671659.6, entitled "PROCESSING METHOD AND APPARATUS, VIDEO DECODING METHOD AND APPARATUS, AND VIDEO ENCODING METHOD AND APPARATUS" and filed on Dec. 31, 2021. The disclosures of the prior applications are hereby incorporated by reference in their entirety.

FIELD OF THE TECHNOLOGY

This application relates to the field of computer technologies, including a coding block processing method and apparatus, a video encoding and decoding method and apparatus, a medium, and a computer device.

BACKGROUND OF THE DISCLOSURE

In current video coding standards such as AV1, AVS3, and VVC, an intra block copy prediction mode is restricted such that a reference block is not allowed to have an overlapping part with a current block. However, since screen content videos generally have a strong spatial correlation, a larger coding block is generally partitioned into a series of smaller sub-blocks in order to predict the current block using adjacent pixels. However, some sub-blocks in the series of smaller sub-blocks have the same motion information, and encoding the same motion information will cause additional bit overheads.

SUMMARY

Embodiments of this disclosure provide a coding block processing method and apparatus, a video encoding and decoding method and apparatus, a medium, and a computer device, which can effectively save overheads of encoding and decoding and improve performance of encoding and decoding.

In an embodiment, a coding block processing method includes receiving a bit stream, and determining, according to the bit stream, that a current coding block is coded in intra block copy mode, and that the current coding block overlaps a reference coding block. The method further includes, in response to the determination that the current coding block overlaps the reference coding block, determining that the current coding block is a merged block and partitioning the merged block into plural sub-blocks. The method further includes determining motion information of the plural sub-blocks based on one set of motion information indicated in the bit stream, such that the plural subblocks have the same motion information.

In an embodiment, a video decoding method includes receiving an encoded video bit stream comprising a current image, and determining, according to the bit stream, that a current coding block is coded in intra block copy prediction mode and that the current coding block overlaps a reference coding block. The method further includes, in response to the determination that the current coding block overlaps the reference coding block, determining that the current coding block is a merged block and partitioning the merged block into plural sub-blocks. The method further includes determining motion information of the plural sub-blocks based on one set of motion information indicated in the bit stream, such that the plural sub-blocks have the same block vector information. The method further includes obtaining, according to the block vector information of the plural sub-blocks and the intra block copy prediction mode, a predictive value of the current coding block from the current image. The method further includes determining, according to the predictive value, a reconstructed value of the current coding block, and decoding the reconstructed value to obtain a decoded video bit stream.

In an embodiment, a coding block processing apparatus including processing circuitry configured to receive a bit stream, and determine, according to the bit stream, that a current coding block is coded in intra block copy prediction mode and that the current coding block overlaps a reference coding block. The processing circuitry is further configured to, in response to the determination that the current coding block overlaps the reference coding block, determine that the current coding block is a merged block and partitioning the merged block into plural sub-blocks. The processing circuitry is further configured to determine motion information of the plural sub-blocks based on one set of motion information indicated in the bit stream, such that the plural sub-blocks have the same motion information.

BRIEF DESCRIPTION OF THE DRAWINGS

To describe the technical solutions in the embodiments of this disclosure more clearly, the following briefly describes the accompanying drawings describing the embodiments. The accompanying drawings in the following description show merely some embodiments of this disclosure, and a person of ordinary skill in the art may derive other drawings from these accompanying drawings.

FIG. 1 is a schematic flowchart of a coding block processing method based on an IBC prediction mode according to an embodiment of this disclosure.

FIG. 2 is a schematic diagram of an intra block copy prediction mode according to an embodiment of this disclosure.

FIG. 7 is a schematic flowchart of a video decoding method according to an embodiment of this disclosure.

FIG. 10 is another schematic flowchart of a video decoding method according to an embodiment of this disclosure.

DESCRIPTION OF EMBODIMENTS

Figures 3, 4:
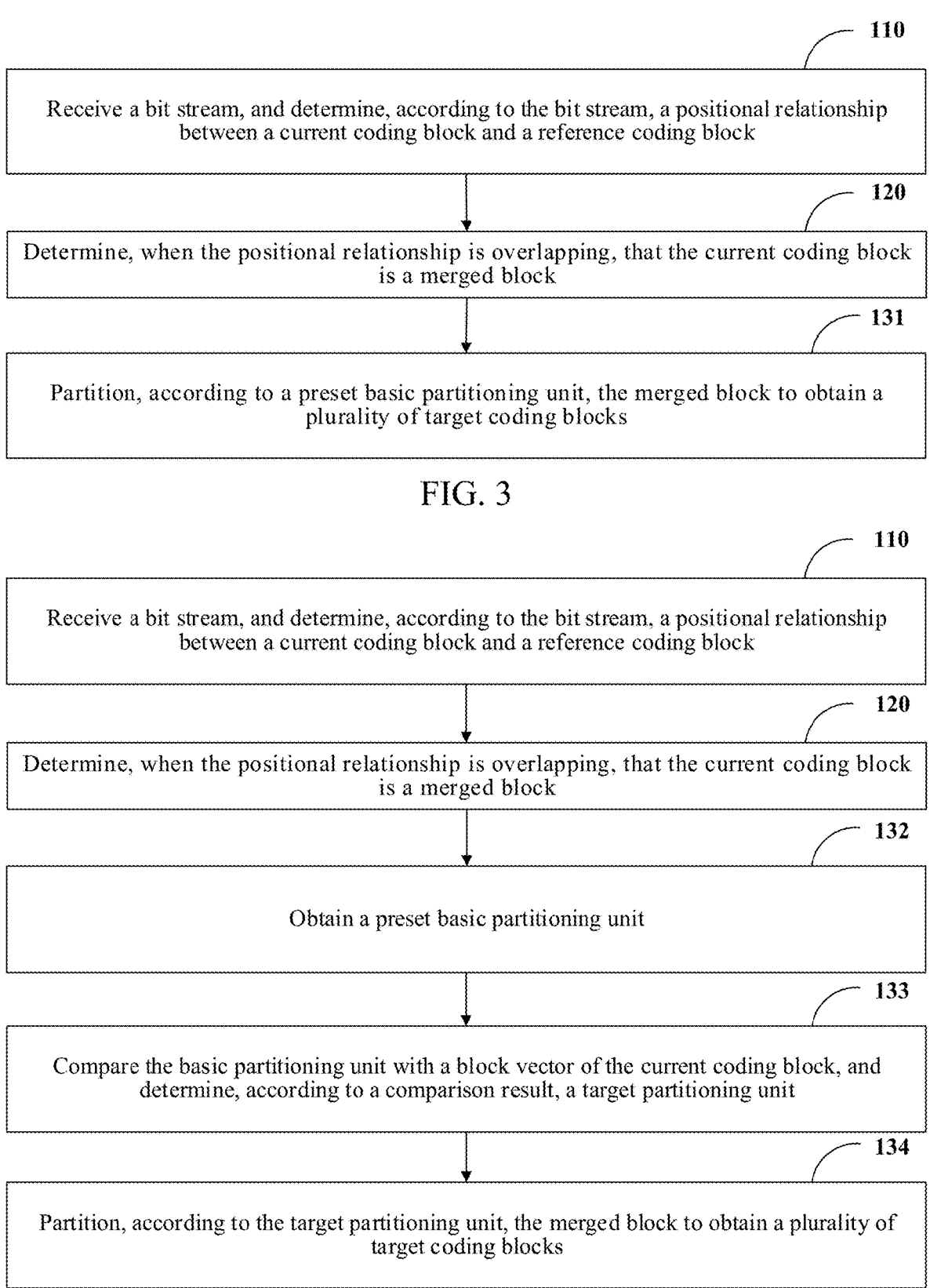
FIG. 3 is another schematic flowchart of a coding block processing method based on an IBC prediction mode according to an embodiment of this disclosure.
FIG. 4 is another schematic flowchart of a coding block processing method based on an IBC prediction mode according to an embodiment of this disclosure.

The technical solutions in the embodiments of this disclosure are clearly described below with reference to the accompanying drawings in the embodiments of this disclosure. The described embodiments are merely some rather than all of the embodiments of this disclosure. All other embodiments obtained by a person of ordinary skill in the art based on the embodiments of this disclosure shall fall within the protection scope of this disclosure.

First, some terms in the descriptions of the embodiments of this disclosure are explained as follows:

Intra-frame prediction: Predicted signals come from encoded and reconstructed regions in the same image.

Intra block copy (IBC) prediction mode: The IBC prediction mode is an intra-frame coding tool adopted in an HEVC screen content coding (SCC) extension, which significantly improves coding efficiency of screen content. The IBC prediction mode is a block-level coding mode. The block matching (BM) technology is used on an encoder side to search for an optimal matching block for each coding unit (CU).

In AVS3, VVC, and AV1, the IBC prediction mode technology is also adopted to improve the performance of the screen content coding. The IBC prediction mode utilizes a spatial correlation of a screen content video and uses an encoded image pixel on a current image to predict a pixel of a current to-be-encoded block, which can effectively save bits required for encoding a pixel.

The current mainstream video coding standards, such as HEVC, VVC, AVS3, AV1, and AV2, all use a block-based hybrid coding framework. The standards divide original video data into a series of coding blocks, and combine video encoding methods such as prediction, transformation, and entropy coding to compress the video data. Motion compensation is a type of prediction method commonly used in video coding. The motion compensation derives, based on redundancy characteristics of video content in a time domain or space domain, a predictive value of a current coding block from an encoded region.

The following series of operations and processing can be performed on an inputted original video signal:

Block partition structure: An input image is partitioned into several non-overlapping processing units according to a size of a processing unit, and a similar compression operation is performed on each processing unit. This processing unit is referred to as a CTU or an LCU. Further, the CTU may continue to be partitioned more finely to obtain one or more basic coding units, referred to as CUs. Each CU is the most basic element in a coding link. Various coding methods that may be used for each CU are described below.

Predictive coding: The predictive coding includes methods such as intra-frame prediction, inter-frame prediction, and IBC prediction. After an original video signal is predicted by using a selected reconstructed video signal, a residual video signal is obtained. An encoder side needs to determine the most suitable mode among many possible predictive coding modes for the current CU and inform a decoder side.

Transform coding & quantization: The residual video signal undergoes transformation operations such as discrete Fourier transform (DFT) and discrete cosine transform (DCT) to convert the signal into a transform domain, which is referred to as a transform coefficient. The signal in the transform domain further undergoes a lossy quantization operation to lose certain information, so that the quantized signal is conducive to compressed expression. In some video coding standards, there may be more than one selectable transformation method. Therefore, the encoder side also needs to select one of the transformation methods for the current CU and inform the decoder side. Fineness of quantization is usually determined by a quantization parameter (QP). A larger QP value indicates that coefficients with larger value ranges are quantized into the same output, usually resulting in greater distortion and a lower bit rate. Conversely, a smaller QP value indicates that coefficients with smaller value ranges are quantized into the same output, usually resulting in less distortion and corresponding to a higher bit rate.

Entropy coding or statistical coding: Statistical coding is performed on the quantized transform domain signal according to a frequency of occurrence of each value, and finally a binary (0 or 1) compressed bit stream is outputted. In addition, other information generated by coding, such as selected modes and block vectors, also needs to undergo entropy coding to reduce a bit rate. The statistical coding is a lossless coding method that can effectively reduce a bit rate required to express the same signal. Common statistical coding methods include variable length coding (VLC) or content adaptive binary arithmetic coding (CABAC).

Loop filtering: Operations of inverse quantization, inverse transformation, and predictive compensation are performed on the encoded image to obtain a reconstructed decoded image. Compared with the original image, some information of the reconstructed image is different from that of the original image due to the impact of quantization, resulting in distortion. Performing a filtering operation on the reconstructed image, such as deblocking filtering, can effectively reduce the extent of the distortion caused by the quantization. Since these filtered reconstructed images are used as a reference for a subsequently encoded image to predict future signals, the foregoing filtering operation is also referred to as loop filtering, that is, a filtering operation within an encoding loop.

In current video coding standards such as AV1, AVS3 and VVC, an IBC prediction mode is restricted such that a reference block is not allowed to have an overlapping part with a current block. However, since screen content videos generally have a strong spatial correlation, a larger coding block generally tends to be partitioned into a series of smaller sub-blocks in order to predict the current block using adjacent pixels, to satisfy the constraint that the reference block does not overlap with the current block. Some partitioned smaller blocks have the same motion information, and encoding the same motion information will cause additional bit overheads.

The embodiments of this disclosure provide a coding block processing method and apparatus based on an IBC prediction mode, a video decoding method, a video decoding apparatus, a medium, and a device, which can effectively save encoding overheads, improve encoding performance, and alleviate the problem of extra bit overheads caused by using adjacent pixels to predict a current block to a certain extent. The embodiments of this disclosure can be applied to an encoding technology based on the IBC prediction mode, as well as video codecs or video compression products that use a technology based on the IBC prediction mode.

Specifically, the method in the embodiments of this disclosure may be performed by a computer device. The computer device may be a device such as a terminal or a server.

To better understand the technical solutions provided in the embodiments of this disclosure, the following briefly introduces application scenarios to which the technical solutions provided in the embodiments of this disclosure are applicable. The application scenarios described below are merely used for describing rather than limiting the embodiments of this disclosure. An example in which a coding block processing method is performed by a computer device is used, where the computer device may be a device such as a terminal or a server.

The embodiments of this disclosure may be implemented with reference to a cloud technology or a blockchain network technology. In the coding block processing method disclosed in the embodiments of this disclosure, data may be stored on a blockchain, for example, a bit stream, a positional relationship, a merged block, and a target coding block may all be stored on the blockchain.

In order to facilitate the storage and query of the bit stream, the positional relationship, the merged block, and the target coding block, the coding block processing method further includes: the bit stream, the positional relationship, the merged block, and the target coding block are sent to a blockchain network, so that a node of the blockchain network fills a new block with the bit stream, the positional relationship, the merged block, and the target coding block, and when a consensus is reached on the new block, the new block is added to a tail end of the blockchain. In the embodiments of this disclosure, on-chain storage may be performed on the bit stream, the positional relationship, the merged block, and the target coding block to realize the backup of records. When the target coding block needs to be obtained, the corresponding target coding block may be directly and quickly obtained from the blockchain, thereby improving the processing efficiency of the coding block.

Detailed descriptions are provided respectively in the following. A description order of the following embodiments is not construed as a limitation on a preferred order of the embodiments.

An embodiment of this disclosure provides a coding block processing method based on an IBC prediction mode. This embodiment of this disclosure takes an example in which the processing method is performed by a computer device for description.

The coding block processing method based on the IBC prediction mode of this disclosure may be applied to an encoder side, and may also be applied to a decoder side. The following embodiments take the decoder side as an example for description.

Refer to FIG. 1. FIG. 1 is a schematic flowchart of a processing method according to an embodiment of this disclosure. The method includes the following steps:

Step 110. Receive a bit stream, and determine, according to the bit stream, a positional relationship between a current coding block and a reference coding block. For example, a bit stream is received, and it is determined, according to the bit stream, that a current coding block is coded in intra block copy mode, and that the current coding block overlaps a reference coding block.

Specifically, the IBC prediction mode is a coding tool adopted in a screen content coding (SCC) extension, which significantly improves coding efficiency of screen content. In AVS3, VVC, and AV1, the IBC technology is also adopted to improve the performance of the screen content coding. The IBC prediction mode utilizes a spatial correlation of a screen content video and uses an encoded image pixel on a current image to predict a pixel of a current to-be-encoded block, which can effectively save bits required for encoding a pixel.

FIG. 2 is a schematic diagram of an intra block copy prediction mode. A gray region is an encoded region, and a reference block is located in the encoded region. A current coding block, referred to as a current block, is located in a white region, that is, a to-be-encoded region. A displacement between the current coding block and the reference block thereof is referred to as a block vector (BV).

It can be understood that one video includes a plurality of pictures. Each picture is partitioned into a plurality of regions, and each region is encoded or decoded. For example, one picture is partitioned into one or more tiles and/or slices. Each tile or slice is partitioned into one or more coding tree units (CTUs) of equal size. In other words, one picture can be partitioned into one or more CTUs of equal size, and the one or more CTUs can constitute one tile or one slice. Each CTU can be partitioned into one or more CUs. Information applied to each CU is encoded as a syntax of the CU, and information commonly applied to one or more CUs included in one CTU is encoded as a syntax of the CTU.

A bit stream includes a bit stream of an image, or a bit stream of a video. On a decoder side, the bit stream includes a decoding bit stream, and on an encoder side, the bit stream includes an encoding bit stream. The following embodiments take the decoding bit stream as an example for description.

After the bit stream is received, the current coding block is determined, and based on the motion information included in the bit stream, positional information of the reference coding block may be determined, and then the positional relationship between the current coding block and the reference coding block is determined.

In an embodiment, the step of receiving a bit stream, and determining, according to the bit stream, a positional relationship between a current coding block and a reference coding block includes:

determining, according to the bit stream, a block vector of the current coding block;

obtaining, according to the block vector, first positional information of the reference coding block; and determining, according to the first positional information of the reference coding block and the current coding block, the positional relationship.

Specifically, after an image is inputted into an encoder, the image is first partitioned into a series of CTUs, and then each CTU may be partitioned by adopting different partition structures such as a quadtree or a binary tree (that is, partitioned into 4 blocks, or partitioned into 2 blocks equally). These coding blocks may try various prediction modes. In the embodiments of this disclosure, a prediction mode used for an IBC coding block is considered. For the IBC coding block, the encoder searches a region in which the current image is reconstructed, to obtain an optimal matching block as a reference block. This process is referred to as "motion estimation". A displacement between the reference block and the current block is referred to as "Block Vector (BV)".

According to the bit stream, a block vector of the current coding block is determined. The block vector represents a relative displacement between the current coding block and an optimal matching block in a reference region of the current coding block. Each partitioned block has corresponding motion information (such as block vector) that needs to be transmitted to the decoder side. The decoder side may obtain the block vector of the current coding block based on the received bit stream and the current coding block.

The relative displacement between the current coding block and the reference coding block is obtained according to the block vector, and then the first positional information of the reference coding block is determined. The reference coding block includes the optimal matching block in the image in which the current coding block is located.

After the current coding block and the positional information of the reference coding block are determined, the positional relationship between the reference coding block and the current coding block may be obtained.

In an embodiment, the method for obtaining, according to the first positional information of the reference coding block and the current coding block, the positional relationship includes:

obtaining second positional information of the current coding block; and determining that the positional relationship is overlapping when a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information.

For example, the second positional information of the current coding block is represented as coordinates (cur_x, cur_y) of the upper left corner, where the horizontal coordinate is cur_x, and the vertical coordinate is cur_y. (b_w, b_h) are a width value and a height value of the current coding block. The block vector of the current IBC coding block is (mv_x, mv_y), mv_x is the x coordinate value of the block vector, and mv_y is the y coordinate value of the block vector.

The calculation of the coordinates (ref_br_x, ref_br_y) of the lower right corner of the first positional information of the reference coding block can be represented as:

$$ref\_br\_x=cur\_x+b\_w-1+mv\_x \tag{1}$$

$$ref\_br\_y=cur\_y+b\_h-1+mv\_y \tag{2}$$

The first positional information of the reference coding block can be calculated by formulas (1) and (2).

When a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information, that is, ref_br_x>=cur_x and ref_br_y>=cur_y, it is determined that the positional relationship is overlapping.

Step 120. Determine, when the positional relationship is overlapping, that the current coding block is a merged block. For example, in response to the determination that the current coding block overlaps the reference coding block, the current coding block is determined to be a merged block and the merged block is partitioned into plural sub-blocks.

The merged block is used to represent coding blocks with the same block vector. That is, the sub-blocks within the merged block all have the same block vector information.

When motion estimation is performed on the current coding block, the reference coding block and the current coding block are allowed to overlap.

If the encoder has completed motion estimation during encoding, some sub-blocks with the same motion information may be found. For example, the motion information of each sub-block is checked in unit of a 32×32 region to determine whether these sub-blocks have the same block vector, and the reference coding block of the sub-block at the lower right corner of the current 32×32 region is in the current 32×32 region. Further, these sub-blocks may be merged, for example, these sub-blocks may be merged into a 32×32 merged block. The block vector of the merged block is equal to the block vector of the sub-block.

Step 130. Partition the merged block to obtain a plurality of target coding blocks, the plurality of target coding blocks including same motion information. For example, motion information of the plural sub-blocks is determined based on one set of motion information indicated in the bit stream, such that the plural subblocks have the same motion information.

Refer to FIG. 3. In an embodiment, the step of partitioning the merged block to obtain a plurality of target coding blocks includes:

131: Partition, according to a preset basic partitioning unit, the merged block to obtain the plurality of target coding blocks.

Specifically, the basic partitioning unit may be equal to a minimum width and a minimum height for partition that are allowed by a codec, or an integer multiple of the minimum width and the minimum height for partition that are allowed by the codec, or other preset basic width and height. The preset basic partitioning unit may be a size of a basic memory unit in a hardware design. For example, the preset basic partitioning unit (part_w, part_h) is a value such as (4, 1), (8, 1), (1, 4), or (1, 8).

For example, the basic partitioning unit is (part_w, part_h), where part_w is a width of the basic partitioning unit, part_h is a height of the basic partitioning unit, the values of part_w and part_h may be respectively set to N_w*min_w and N_h*min_h, and both N_w and N_h are integers greater than or equal to 1. min_w and min_h are respectively the minimum width and the minimum height for partition that are allowed by the codec.

According to the foregoing preset basic partitioning unit (part_w, part_h), the current block is partitioned into target coding blocks of size (part_w, part_h). Subsequently, all the target coding blocks may be reconstructed one by one.

In an embodiment, before the partitioning, according to a preset basic partitioning unit, the merged block, the method further includes:

obtaining an image sampling format of the current coding block;

determining, according to the image sampling format, an image sampling ratio of the current coding block; and the partitioning, according to a preset basic partitioning unit, the merged block to obtain the plurality of target coding blocks includes:

partitioning, according to the preset basic partitioning unit, a chrominance component of the merged block to obtain a plurality of target coding blocks with chrominance; and partitioning, according to the preset basic partitioning unit and the image sampling ratio, a luminance component of the merged block to obtain a plurality of target coding blocks with luminance.

Specifically, when the merged block is partitioned, the merged block may be partitioned according to the sampling format of the current image. The image sampling format of the current coding block is obtained, and the image sampling format includes but is not limited to a YUV420 format, a YUV444 format, and the like. According to the image sampling format, an image sampling ratio of the current coding block is determined. For example, it is assumed that a width ratio of the image sampling ratio of a luminance image to a chrominance image is ratio_w, and a height ratio is ratio_h. In the YUV420 format, for the image sampling ratio, ratio_w=2, and ratio_h=2. In the YUV444 format, ratio_w=1, and ratio_h=1.

After the image sampling format and the image sampling ratio are determined, for the chrominance component, according to the preset basic partitioning unit, the chrominance component of the merged block is partitioned to obtain a plurality of target coding blocks with chrominance; and for the luminance component, according to the preset basic partitioning unit and the image sampling ratio, the luminance component of the merged block may be partitioned to obtain a plurality of target coding blocks with luminance.

For example, it is assumed that a width ratio of the image sampling ratio of a luminance image to a chrominance image is ratio_w, and a height ratio is ratio_h. The chrominance image is partitioned by using the basic partitioning unit (part_w, part_h) as a parameter, and the luminance image is partitioned by using (part_w*ratio_w, part_h*ratio_h) as a parameter.

In the YUV420 format, ratio_w=2, and ratio_h=2. If the current coding block includes the chrominance component and the luminance component, the luminance component of the current coding block is partitioned into sub-blocks in unit of (part_w*2, part_y*2), that is, a plurality of target coding blocks with luminance. Correspondingly, the chrominance component of the current coding block is partitioned in unit of (part_w, part_y) to obtain a plurality of target coding blocks with chrominance.

In the YUV420 format, ratio_w=2, and ratio_h=2. If the current coding block includes only the luminance component, the current coding block is partitioned in unit of (part_w, part_h) to obtain a plurality of target coding blocks with luminance.

In the YUV444 format, ratio_w=1, and ratio_h=1. A quantity of chrominance samples is the same as a quantity of luminance samples, and both the chrominance samples and the luminance samples adopt a common sampling format, so that the current coding block is partitioned in unit of (part_w, part_h) to obtain a plurality of target coding blocks.

In this way, according to the preset basic partitioning unit and the image sampling ratio, the partition corresponding to the sampling ratio may be carried out for pictures in different sampling formats, so that the chrominance component and the luminance component do not need to be adjusted during subsequent encoding or decoding, which improves the encoding efficiency.

Refer to FIG. 4. In an embodiment, the step of partitioning, according to a preset basic partitioning unit, the merged block to obtain the plurality of target coding blocks further includes:

132: Obtain the preset basic partitioning unit.

133: Compare the basic partitioning unit with the block vector of the current coding block, and determine, according to a comparison result, a target partitioning unit.

134: Partition, according to the target partitioning unit, the merged block to obtain the plurality of target coding blocks.

In an embodiment of this disclosure, the method for comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using the height value of the basic partitioning unit as the target partitioning unit.

Specifically, the block vector may include an x coordinate and a y coordinate in a planar coordinate system.

For example, the basic partitioning unit is (part_w, part_h), where part_w is a width value of the basic partitioning unit, and part_h is a height value of the basic partitioning unit. The block vector of the current coding block is (mv_x, mv_y), where mv_x is the x coordinate value of the block vector, and mv_y is the y coordinate value of the block vector.

If mv_y<=−part_h, on the x coordinate of the current coding block, partition is performed according to the b_w value, and on the y coordinate of the current coding block, partition is performed according to the part_h value, that is, the current coding block is partitioned using (b_w, part_h) as the target partitioning unit. If mv_y>−part_h, the current coding block is partitioned using the basic partitioning unit (part_w, part_h) as the target partitioning unit.

Similarly, when the x coordinate value of the block vector is less than or equal to the width value of the basic partitioning unit, on the x coordinate of the current coding block, the width value of the basic partitioning unit is used as the target partitioning unit, and on the y coordinate of the current coding block, the height value of the current coding block is used as the target partitioning unit; or when the x coordinate value of the block vector is greater than the width value of the basic partitioning unit, on the x coordinate of the current coding block, the width value of the basic partitioning unit is used as the target partitioning unit, and on the y coordinate of the current coding block, the height value of the basic partitioning unit is used as the target partitioning unit.

In the foregoing example, if mv_x<=−part_w, on the x coordinate of the current coding block, partition is performed according to the width value part_w of the basic partitioning unit, and on the y coordinate of the current coding block, partition is performed according to the height value b_h of the current coding block, that is, the current coding block is partitioned using (part_w, b_h) as the target partitioning unit. If mv_x>−part_w, on the x coordinate of the current coding block, partition is performed according to the width value part_w of the basic partitioning unit, and on the y coordinate of the current coding block, partition is performed according to the height value part_h of the basic partitioning unit, that is, the current coding block is partitioned using the basic partitioning unit (part_w, part_h) as the target partitioning unit.

The coordinate system of the positional information in this disclosure may include a plurality of directions, and this embodiment is also applicable to a partition situation in a coordinate system with more than two directions.

In another embodiment of this disclosure, the partition includes at least the partition of the x coordinate and the y coordinate, and the method for comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using a height value of the current coding block as the target partitioning unit.

Specifically, the block vector may include an x coordinate and a y coordinate in a planar coordinate system.

For example, the basic partitioning unit is (part_w, part_h), where part_w is a width of the basic partitioning unit, and part_h is a height of the basic partitioning unit. The block vector of the current coding block is (mv_x, mv_y), where mv_x is the x coordinate value of the block vector, and mv_y is the y coordinate value of the block vector.

If mv_y<=−part_h, on the x coordinate of the current coding block, partition is performed according to the b_w value, and on the y coordinate of the current coding block, partition is performed according to the part_h value, that is, the current coding block is partitioned using (b_w, part_h) as the target partitioning unit. If mv_y>−part_h, on the x coordinate of the current coding block, partition is performed according to the width value part_w of the basic partitioning unit, and on the y coordinate of the current coding block, partition is performed according to the height value b_h of the current coding block, that is, the current coding block is partitioned using (part_w, b_h) as the target partitioning unit.

Similarly, when the x coordinate value of the block vector is less than or equal to the width value of the basic partitioning unit, on the x coordinate of the current coding block, the width value of the basic partitioning unit is used as the target partitioning unit, and on the y coordinate of the current coding block, the height value of the current coding block is used as the target partitioning unit; or when the x coordinate value of the block vector is greater than the width value of the basic partitioning unit, on the x coordinate of the current coding block, the width value of the current coding block is used as the target partitioning unit, and on the y coordinate of the current coding block, the height value of the basic partitioning unit is used as the target partitioning unit.

In the foregoing example, if mv_x<=−part_w, on the x coordinate of the current coding block, partition is performed according to the width value part_w of the basic partitioning unit, and on the y coordinate of the current coding block, partition is performed according to the height value b_h of the current coding block, that is, the current coding block is partitioned using (part_w, b_h) as the target partitioning unit. If mv_x>−part_w, on the x coordinate of the current coding block, partition is performed according to the width value b_w of the current coding block, and on the y coordinate of the current coding block, partition is performed according to the height value part_h of the basic partitioning unit, that is, the current coding block is partitioned using (b_w, part_h) as the target partitioning unit.

The coordinate system of the positional information in this disclosure may include a plurality of directions, and this embodiment is also applicable to a partition situation in a coordinate system with more than two directions.

In this way, in this disclosure, a bit stream is received, and a positional relationship between a current coding block and a reference coding block is determined according to the bit stream; and when the positional relationship is overlapping, it is determined that the current coding block is a merged block, and the merged block is partitioned to obtain a plurality of target coding blocks. In this disclosure, it is determined that the current coding block is a merged block based on the overlapping positional relationship between the current coding block and the reference coding block, and the merged block is partitioned. The target coding blocks obtained after partition have the same motion information. When encoding is performed at the encoder side, it is only necessary to encode the motion information of the merged block without encoding the motion information of each sub-block separately, which effectively saves bit overheads and helps improve encoding performance. At the decoder side, in this disclosure, whether the current coding block is a merged block may be implicitly deduced according to the overlapping positional relationship between the current coding block and the reference coding block, as well as information such as a position, a width, and a height of the current coding block, and the merged block is partitioned according to a preset partitioning method, and partitioned into a plurality of target coding blocks.

In addition, the partitioning unit is determined according to the motion information of the current coding block, and there are a plurality of partitioning methods, so that the partition of the coding block can use adjacent pixels to predict the current block as much as possible under the premise of satisfying a minimum partitioning unit, which generally has a strong spatial correlation for a screen content video, and may improve the prediction capability of the IBC prediction mode to a certain extent.

All the foregoing technical solutions may be combined to form an embodiment of this disclosure, and details are not described herein again.

Figure 5:
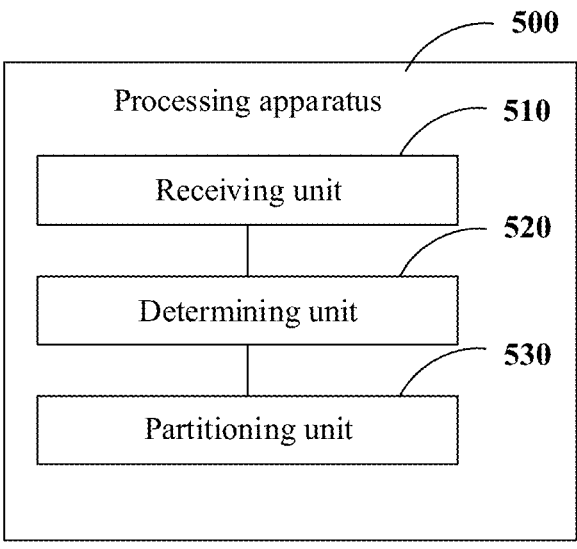
FIG. 5 is a schematic structural diagram of a coding block processing apparatus based on an IBC prediction mode according to an embodiment of this disclosure.

To help better implement the coding block processing method provided in the embodiments of this disclosure, a coding block processing apparatus based on an IBC prediction mode is further provided in the embodiments of this disclosure. Refer to FIG. 5. FIG. 5 is a schematic structural diagram of a processing apparatus according to an embodiment of this disclosure. The processing apparatus 500 may include:

a receiving unit 510, configured to receive a bit stream, and determine, according to the bit stream, a positional relationship between a current coding block and a reference coding block;

a determining unit 520, configured to determine, when the positional relationship is overlapping, that the current coding block is a merged block; and a partitioning unit 530, configured to partition the merged block to obtain a plurality of target coding blocks, the plurality of target coding blocks including same motion information.

The receiving unit 510 may be configured to determine, according to the bit stream, a block vector of the current coding block; obtain, according to the block vector, first positional information of the reference coding block; and determine, according to the first positional information and the current coding block, the positional relationship.

The receiving unit 510 may be configured to obtain second positional information of the current coding block; and determine that the positional relationship is overlapping when a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information.

The partitioning unit 530 may be configured to partition, according to a preset basic partitioning unit, the merged block to obtain the plurality of target coding blocks.

The partitioning unit 530 may be further configured to obtain an image sampling format of the current coding block; determine, according to the image sampling format, an image sampling ratio of the current coding block; and partition, according to the basic partitioning unit, a chrominance component of the merged block to obtain a plurality of target coding blocks with chrominance; and partition, according to the preset basic partitioning unit and the image sampling ratio, a luminance component of the merged block to obtain a plurality of target coding blocks with luminance.

The partitioning unit 530 may be configured to obtain a basic partitioning unit; compare the basic partitioning unit with the block vector of the current coding block, and determine, according to a comparison result, a target partitioning unit; and partition, according to the target partitioning unit, the merged block to obtain the plurality of target coding blocks.

The partitioning unit 530 may be configured to when a y coordinate value of the block vector is less than or equal to a height value of the basic partitioning unit, on an x coordinate of the current coding block, use a width value of the current coding block as the target partitioning unit, and on a y coordinate of the current coding block, use the height value of the basic partitioning unit as the target partitioning unit; or when a y coordinate value of the block vector is greater than a height value of the basic partitioning unit, on an x coordinate of the current coding block, use a width value of the basic partitioning unit as the target partitioning unit, and on a y coordinate of the current coding block, use the height value of the basic partitioning unit as the target partitioning unit.

The partitioning unit 530 may be configured to when a y coordinate value of the block vector is less than or equal to a height value of the basic partitioning unit, on an x coordinate of the current coding block, use a width value of the current coding block as the target partitioning unit, and on a y coordinate of the current coding block, use the height value of the basic partitioning unit as the target partitioning unit; or when a y coordinate value of the block vector is greater than a height value of the basic partitioning unit, on an x coordinate of the current coding block, use a width value of the basic partitioning unit as the target partitioning unit, and on a y coordinate of the current coding block, use a height value of the current coding block as the target partitioning unit.

For functions of the modules in the processing apparatus 500 in the embodiments of this disclosure, refer to a specific implementation of any embodiment in the foregoing method embodiments, and details are not repeatedly described.

Each unit in the foregoing processing apparatus 500 may be implemented in whole or in part by software, hardware, and combinations thereof. The foregoing each unit may be built in or independent of a processor of a computer device in a hardware form, or may be stored in a memory of the computer device in a software form, so that the processor invokes and performs an operation corresponding to each of the foregoing each unit.

For example, the processing apparatus 500 may be integrated into a terminal or a server that has a memory and is equipped with a processor to have a computing capability, or the processing apparatus 500 is the terminal or the server. The terminal may be a smartphone, a tablet computer, a laptop computer, a smart TV, a smart speaker, a wearable smart device, a personal computer (PC), and other devices. The terminal may alternatively include a client, and the client may be a video client, a browser client, or an instant messaging client. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

Figure 6:
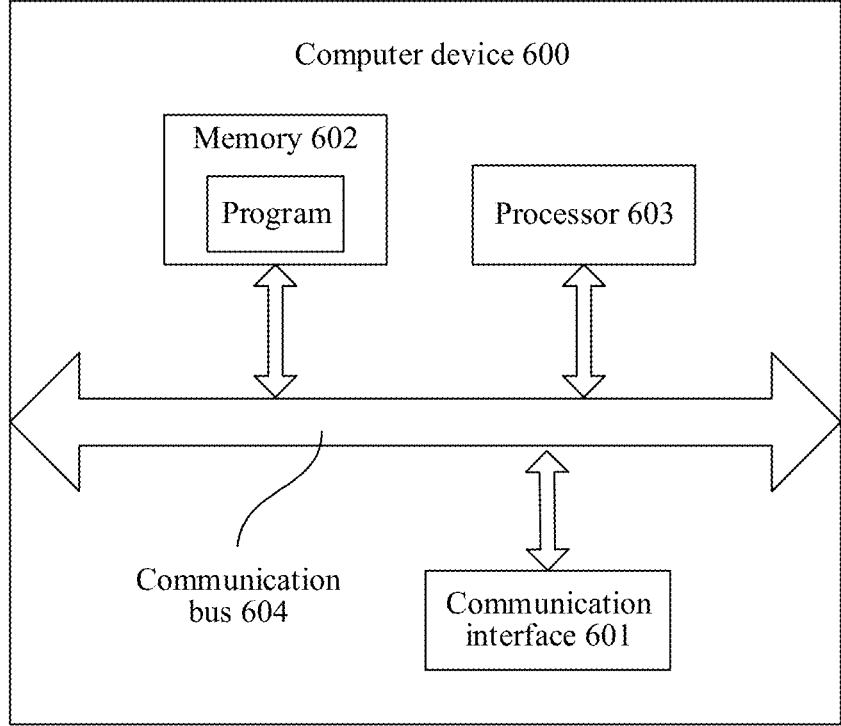
FIG. 6 is a schematic structural diagram of a computer device according to an embodiment of this disclosure.

FIG. 6 is a schematic structural diagram of a computer device 600 according to an embodiment of this disclosure. As shown in FIG. 6, the computer device 600 may include: a communication interface 601, a memory 602 (non-transitory computer-readable storage medium), a processor 603 (processing circuitry), and a communication bus 604. The communication interface 601, the memory 602, and the processor 603 implement communication with each other by using the communication bus 604. The communication interface 601 is configured for the computer device 600 to perform data communication with an external device. The memory 602 may be configured to store a software program and a module, and the processor 603 runs the software program and the module stored in the memory 602, for example, a software program for a corresponding operation in the foregoing method embodiments.

The processor 603 may invoke the software program and the module stored in the memory 602 to perform the following operations:

receiving a bit stream, and determining, according to the bit stream, a positional relationship between a current coding block and a reference coding block;

determining, when the positional relationship is overlapping, that the current coding block is a merged block; and partitioning the merged block to obtain a plurality of target coding blocks, the plurality of target coding blocks including same motion information.

The computer device 600 may be integrated into a terminal or a server that has a memory and is equipped with a processor to have a computing capability, or the computer device 600 is the terminal or the server. The terminal may be a smartphone, a tablet computer, a laptop computer, a smart TV, a smart speaker, a wearable smart device, a personal computer, and other devices. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform.

Refer to FIG. 7. This disclosure further provides a video decoding method, including the following steps:

710: Receive an encoded video bit stream including a current image.

720: Determine, according to the bit stream, a positional relationship between a current coding block and a reference coding block.

730: Determine, when the positional relationship is overlapping, that the current coding block is a merged block.

740: Partition the merged block to obtain a plurality of target coding blocks, the plurality of target coding blocks including same motion information.

750: Obtain, according to block vector information of the plurality of target coding blocks and an intra block copy prediction mode, a predictive value of the current coding block from the current image.

760: Determine, according to the predictive value, a reconstruction value (i.e., reconstructed value) of the current coding block.

770: Decode the reconstruction value to obtain a decoded video bit stream.

Specifically, the encoded video bit stream including the current image is received, and the positional relationship between the current coding block and the reference coding block is determined according to the bit stream for each frame of image in the video bit stream. When the positional relationship is overlapping, it is determined that the current coding block is a merged block, and the merged block is partitioned to obtain a plurality of target coding blocks.

In an embodiment, the method for determining, according to the bit stream, a positional relationship between a current coding block and a reference coding block includes:

determining, according to the bit stream, a block vector of the current coding block;

obtaining, according to the block vector, first positional information of the reference coding block; and determining, according to the first positional information of the reference coding block and the current coding block, the positional relationship.

In an embodiment, the method for determining, according to the first positional information and the current coding block, the positional relationship includes:

obtaining second positional information of the current coding block; and determining that the positional relationship is overlapping when a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information.

In an embodiment, the method for partitioning the merged block to obtain a plurality of target coding blocks includes:

partitioning, according to a preset basic partitioning unit, the merged block to obtain the plurality of target coding blocks.

In an embodiment, before the partitioning the merged block to obtain a plurality of target coding blocks, the method further includes:

obtaining an image sampling format of the current coding block;

determining, according to the image sampling format, an image sampling ratio of the current coding block; and the partitioning, according to a preset basic partitioning unit, the merged block to obtain the plurality of target coding blocks includes:

partitioning, according to the preset basic partitioning unit, a chrominance component of the merged block to obtain a plurality of target coding blocks with chrominance; and partitioning, according to the preset basic partitioning unit and the image sampling ratio, a luminance component of the merged block to obtain a plurality of target coding blocks with luminance.

In an embodiment, the method for partitioning, according to a preset basic partitioning unit, the merged block to obtain the plurality of target coding blocks includes:

obtaining the basic partitioning unit;

comparing the basic partitioning unit with the block vector of the current coding block, and determine, according to a comparison result, a target partitioning unit;

partitioning, according to the target partitioning unit, the merged block to obtain the plurality of target coding blocks.

In an embodiment, the comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using the height value of the basic partitioning unit as the target partitioning unit.

In an embodiment, the comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using a height value of the current coding block as the target partitioning unit.

The specific implementation is the same as the foregoing coding block processing method, and details will not be described herein one by one.

After the target coding block is determined, in step 750, according to block vectors of the plurality of target coding blocks and an intra block copy prediction mode, a predictive value of the current coding block is obtained from the current image.

The intra block copy prediction mode may include: intra block copy prediction, intra string copy prediction, and the like. In a specific implementation of encoding or decoding, these prediction methods may be used alone or in combination. For coding blocks that use these prediction methods, it is usually necessary to explicitly or implicitly encode one or more two-dimensional displacement vectors in a bit stream to indicate a displacement of the current block (or a co-located block of the current block) relative to one or more reference blocks thereof.

In steps 760 and 770, according to the predictive value, a reconstruction value of the current coding block is determined, and the reconstruction value is decoded to obtain a decoded video bit stream.

Figure 8:
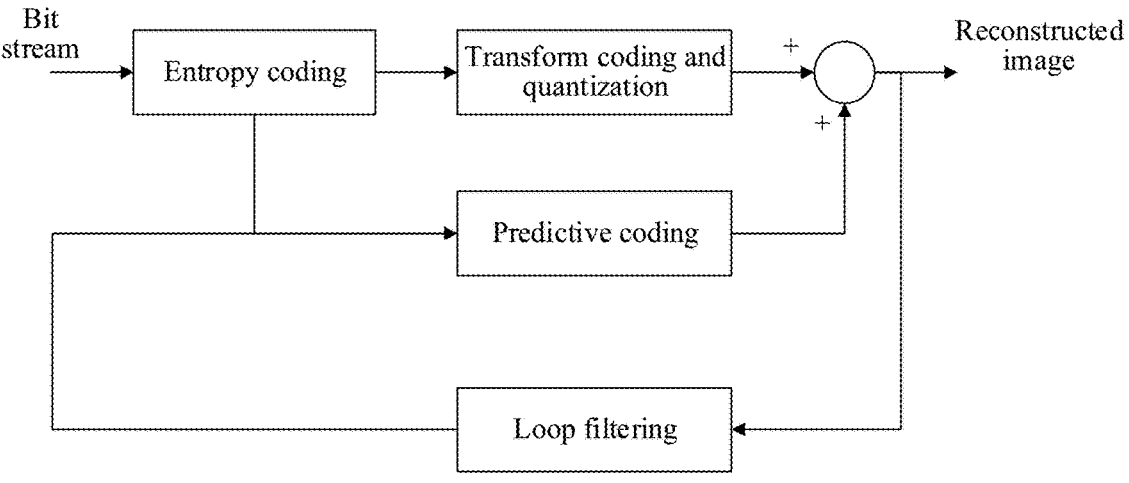
FIG. 8 is an example diagram of a basic procedure of a video decoder according to an embodiment of this disclosure.

Refer to FIG. 8. FIG. 8 is an example diagram of a basic procedure of a video decoder. At a decoder side, after obtaining a bit stream, the decoder determines each CU and first performs entropy decoding to obtain various mode information and quantized transform coefficients. Each coefficient undergoes inverse quantization and inverse transformation to obtain a residual signal. In addition, a predicted signal corresponding to the CU is obtained by using a preset predictive coding method according to known coding mode information. After the residual signal and the predicted signal are added, a reconstructed signal may be obtained. Finally, the reconstruction value of the image is decoded, to generate a final output signal through a loop filtering operation.

At an encoder side, any of the foregoing coding block processing methods may be applied at the same time, to perform encoding processing at the video encoder side.

Figure 9:
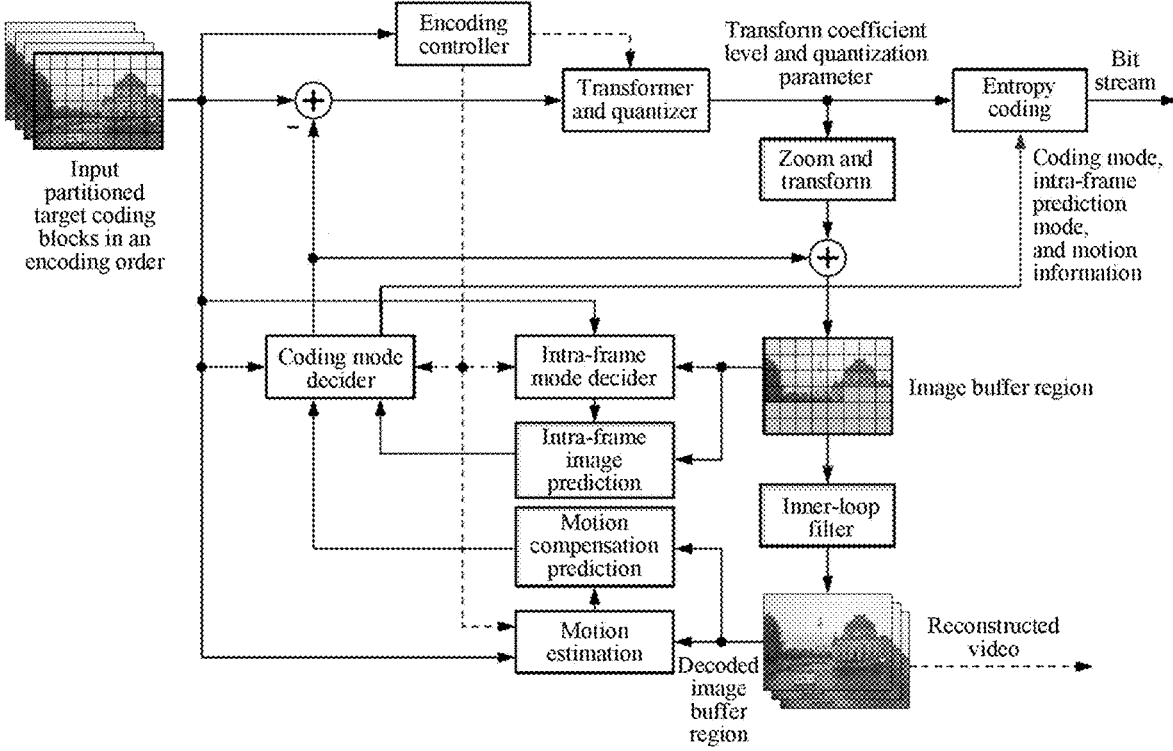
FIG. 9 is another example diagram of a basic procedure of a video encoder according to an embodiment of this disclosure.

FIG. 9 is an example diagram of a basic procedure of a video encoder. At an encoder side, a coding block is processed according to any one of the foregoing processing methods based on an IBC prediction mode to obtain a target coding block. Transform coding and quantization are performed on the target coding block. In addition, the target coding block undergoes intra-frame image prediction through an intra-frame mode decider determined by a coding mode decider, and undergoes motion compensation prediction based on motion estimation, to finally obtain prediction information. According to a coding mode, an intra-frame prediction mode, and motion information, entropy coding is performed on data obtained after the transform coding and the quantization and the prediction information, to output an encoded bit stream.

Refer to FIG. 10. In an embodiment, before the step of determining, according to the bit stream, a positional relationship between a current coding block and a reference coding block, the method further includes the following steps:

780: Determine, according to the encoded video bit stream, a sequence header flag.

790: Determine, when a flag value of the sequence header flag is a predetermined value, the positional relationship between the current coding block and the reference coding block, where the flag value of the sequence header flag is set when an encoder side performs encoding.

Specifically, in a bit stream structure, a sequence layer includes a sequence header, and a flag value may be set for the sequence header flag at the encoder side to determine whether to apply the coding block processing method of this disclosure. At the decoder side, before the current coding block is processed, the flag value of the sequence header flag is extracted. When the flag value is a predetermined value, the coding block processing method in this disclosure is used to process the current coding block; otherwise, when the flag value of the sequence header flag is not a predetermined value, the processing method in this disclosure is not used.

For example, when the flag value of the sequence header flag is 1, it indicates that the processing method in this disclosure is used, and when the value is 0, it indicates that the processing method of this disclosure is not used. In this way, the sequence header flag may be used as a switch value of the processing method of this disclosure.

In an embodiment, the video decoding method further includes:

adjusting, when it is determined that the current coding block is the merged block, a residual coefficient corresponding to the current coding block to 0.

Specifically, if the current coding block is the merged block, encoding of the residual coefficient is skipped, and the residual coefficient corresponding to the current coding block is adjusted to 0. When the reconstruction value is determined, the predictive value may be determined as the reconstruction value, and each target coding block is reconstructed.

In this way, there is no need to decode the residual coefficient at the decoder side, and the predictive value may be directly determined as the reconstruction value, which improves decoding efficiency to a certain extent.

All the foregoing technical solutions may be combined to form an embodiment of this disclosure, and details are not described herein again.

In this disclosure, an encoded video bit stream including a current image is received; a positional relationship between a current coding block and a reference coding block is determined according to the bit stream; it is determined, when the positional relationship is overlapping, that the current coding block is a merged block; the merged block is partitioned to obtain a plurality of target coding blocks, the plurality of target coding blocks including same motion information; a predictive value of the current coding block is obtained from the current image according to block vector information of the plurality of target coding blocks and an intra block copy prediction mode; a reconstruction value of the current coding block is determined according to the predictive value; and the reconstruction value is decoded, to obtain a decoded video bit stream. At the decoder side, in this disclosure, whether the current coding block is a merged block may be implicitly deduced according to the overlapping positional relationship between the current coding block and the reference coding block, as well as information such as a position, a width, and a height of the current coding block, and the merged block is partitioned according to a preset partitioning method, and partitioned into a plurality of target coding blocks.

Figure 11:
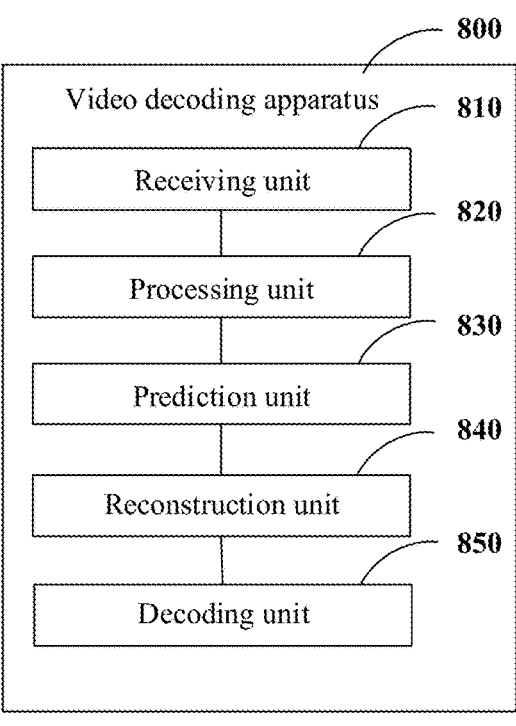
FIG. 11 is a schematic structural diagram of a video decoding apparatus according to an embodiment of this disclosure.

To help better implement the video decoding method in this embodiment of this disclosure, an embodiment of this disclosure further provides a video decoding apparatus. FIG. 11 is a schematic structural diagram of a video decoding apparatus according to an embodiment of this disclosure. The video decoding apparatus 800 may include:

a receiving unit 810, configured to receive an encoded video bit stream including a current image;

a processing unit 820, configured to determine, according to the bit stream, a positional relationship between a current coding block and a reference coding block; determine, when the positional relationship is overlapping, that the current coding block is a merged block; and partition the merged block to obtain a plurality of target coding blocks, the plurality of target coding blocks including same motion information;

a prediction unit 830, configured to obtain, according to block vectors of the plurality of target coding blocks and an intra block copy prediction mode, a predictive value of the current coding block from the current image;

a reconstruction unit 840, configured to determine, according to the predictive value, a reconstruction value of the current coding block; and a decoding unit 850, configured to decode the reconstruction value to obtain a decoded video bit stream.

For functions of the modules in the video decoding apparatus in the embodiments of this disclosure, refer to a specific implementation of any embodiment in the foregoing method embodiments, and details are not repeatedly described.

Each unit in the video decoding apparatus may be implemented in whole or in part by software, hardware, or a combination thereof. The foregoing each unit may be built in or independent of a processor of a computer device in a hardware form, or may be stored in a memory of the computer device in a software form, so that the processor invokes and performs an operation corresponding to each of the foregoing each unit.

For example, the video decoding apparatus may be integrated into a terminal or a server that has a memory and is equipped with a processor to have a computing capability, or the video decoding apparatus is the terminal or the server. The terminal may be a smartphone, a tablet computer, a laptop computer, a smart TV, a smart speaker, a wearable smart device, a personal computer (PC), and other devices. The terminal may alternatively include a client, and the client may be a video client, a browser client, or an instant messaging client. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

Figure 12:
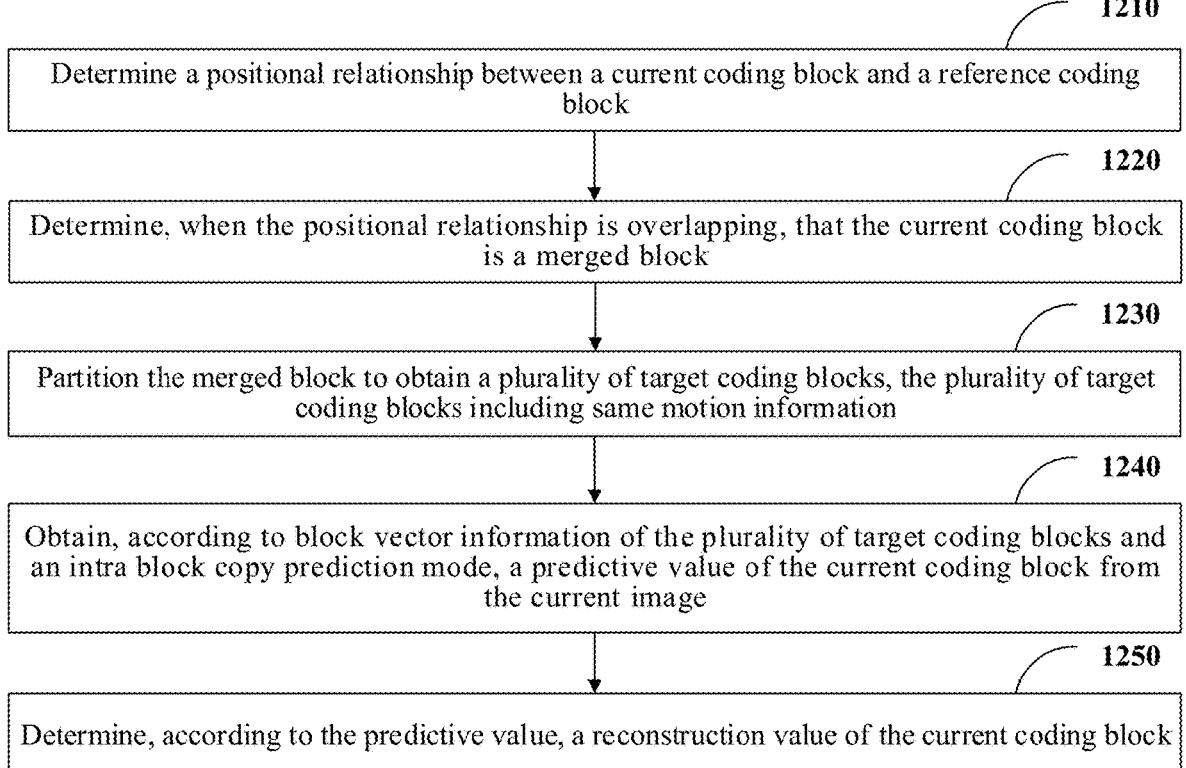
FIG. 12 is a schematic flowchart of a video encoding method according to an embodiment of this disclosure.

Refer to FIG. 12. This disclosure further provides a video encoding method, including the following steps:

1210: Determine a positional relationship between a current coding block and a reference coding block.

1220: Determine, when the positional relationship is overlapping, that the current coding block is a merged block.

1230: Partition the merged block to obtain a plurality of target coding blocks, the plurality of target coding blocks including same motion information.

1240: Obtain, according to block vector information of the plurality of target coding blocks and an intra block copy prediction mode, a predictive value of the current coding block from the current image.

1250: Determine, according to the predictive value, a reconstruction value of the current coding block.

Specifically, at the encoder side, for each frame of image, a positional relationship between a current coding block and a reference coding block is determined. When the positional relationship is overlapping, it is determined that the current coding block is a merged block, and then the merged block is partitioned to obtain a plurality of target coding blocks.

In an embodiment, the method for determining a positional relationship between a current coding block and a reference coding block includes:

determining, according to the bit stream, a block vector of the current coding block;

obtaining, according to the block vector, first positional information of the reference coding block; and determining, according to the first positional information of the reference coding block and the current coding block, the positional relationship.

In an embodiment, the method for determining, according to the first positional information and the current coding block, the positional relationship includes:

obtaining second positional information of the current coding block; and determining that the positional relationship is overlapping when a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information.

In an embodiment, the method for partitioning the merged block to obtain a plurality of target coding blocks includes:

partitioning, according to a preset basic partitioning unit, the merged block to obtain the plurality of target coding blocks.

In an embodiment, before the partitioning the merged block to obtain a plurality of target coding blocks, the method further includes:

obtaining an image sampling format of the current coding block;

determining, according to the image sampling format, an image sampling ratio of the current coding block; and the partitioning, according to a preset basic partitioning unit, the merged block to obtain the plurality of target coding blocks includes:

partitioning, according to the preset basic partitioning unit, a chrominance component of the merged block to obtain a plurality of target coding blocks with chrominance; and partitioning, according to the preset basic partitioning unit and the image sampling ratio, a luminance component of the merged block to obtain a plurality of target coding blocks with luminance.

In an embodiment, the method for partitioning, according to a preset basic partitioning unit, the merged block to obtain the plurality of target coding blocks includes:

obtaining the basic partitioning unit;

comparing the basic partitioning unit with the block vector of the current coding block, and determine, according to a comparison result, a target partitioning unit; and partitioning, according to the target partitioning unit, the merged block to obtain the plurality of target coding blocks.

In an embodiment, the comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using the height value of the basic partitioning unit as the target partitioning unit.

In an embodiment, the comparing the basic partitioning unit with the block vector of the current coding block, and determining, according to a comparison result, a target partitioning unit includes:

when a y coordinate value of the block vector is less than or equal to a height value of the basic partitioning unit, on an x coordinate of the current coding block, using a width value of the current coding block as the target partitioning unit, and on a y coordinate of the current coding block, using the height value of the basic partitioning unit as the target partitioning unit; or when a y coordinate value of the block vector is greater than a height value of the basic partitioning unit, on an x coordinate of the current coding block, using a width value of the basic partitioning unit as the target partitioning unit, and on a y coordinate of the current coding block, using a height value of the current coding block as the target partitioning unit.

The specific implementation is the same as the foregoing coding block processing method, and details will not be described herein one by one.

In an embodiment, at the encoder side, a flag value of a predetermined value is set in the sequence header flag, so that the decoder side determines whether to apply the decoding method of this disclosure based on the predetermined value. The specific implementation is the same as the foregoing video decoding method, and details will not be described herein one by one.

All the foregoing technical solutions may be combined to form an embodiment of this disclosure, and details are not described herein again.

In this embodiment of this disclosure, by determining a positional relationship between a current coding block and a reference coding block; determining, when the positional relationship is overlapping, that the current coding block is a merged block; partitioning the merged block to obtain a plurality of target coding blocks, the plurality of target coding blocks including same motion information; obtaining, according to block vector information of the plurality of target coding blocks and an intra block copy prediction mode, a predictive value of the current coding block from the current image; and determining, according to the predictive value, a reconstruction value of the current coding block, when encoding is performed at the encoder side, it is only necessary to encode the motion information of the merged block without encoding the motion information of each sub-block separately, which effectively saves bit overheads and helps improve encoding performance. In addition, the partitioning unit is determined according to the motion information of the current coding block, and there are a plurality of partitioning methods, so that the partition of the coding block can use adjacent pixels to predict the current block as much as possible under the premise of satisfying a minimum partitioning unit, which generally has a strong spatial correlation for a screen content video, and may improve the prediction capability of the intra block copy prediction mode to a certain extent.

Figure 13:
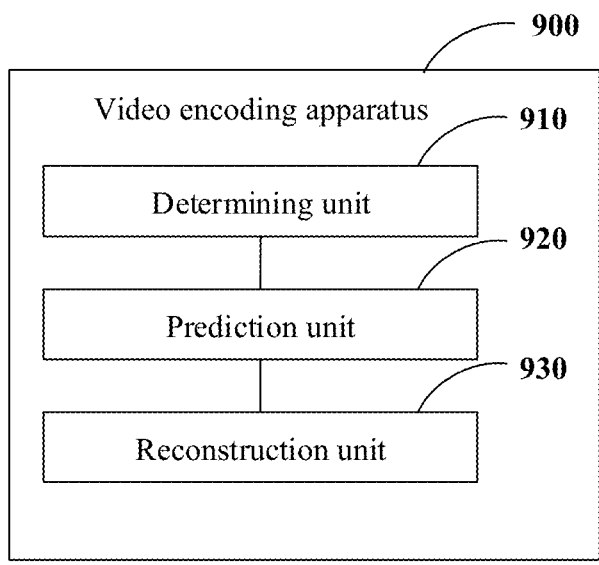
FIG. 13 is a schematic structural diagram of a video encoding apparatus according to an embodiment of this disclosure.

To help better implement the video encoding method in this embodiment of this disclosure, an embodiment of this disclosure further provides a video encoding apparatus. FIG. 13 is a schematic structural diagram of a video encoding apparatus according to an embodiment of this disclosure. The video encoding apparatus 900 may include:

a determining unit 910, configured to determine a positional relationship between a current coding block and a reference coding block; determine, when the positional relationship is overlapping, that the current coding block is a merged block; and partition the merged block to obtain a plurality of target coding blocks, the plurality of target coding blocks including same motion information;

a prediction unit 920, configured to obtain, according to block vector information of the plurality of target coding blocks and an intra block copy prediction mode, a predictive value of the current coding block from the current image; and a reconstruction unit 930, configured to determine, according to the predictive value, a reconstruction value of the current coding block.

For functions of the modules in the video encoding apparatus 900 in the embodiments of this disclosure, refer to a specific implementation of any embodiment in the foregoing method embodiments, and details are not repeatedly described.

Each unit in the video encoding apparatus 900 may be implemented in whole or in part by software, hardware, or a combination thereof. The foregoing each unit may be built in or independent of a processor of a computer device in a hardware form, or may be stored in a memory of the computer device in a software form, so that the processor invokes and performs an operation corresponding to each of the foregoing each unit.

For example, the video encoding apparatus 900 may be integrated into a terminal or a server that has a memory and is equipped with a processor to have a computing capability, or the video encoding apparatus 900 is the terminal or the server. The terminal may be a smartphone, a tablet computer, a laptop computer, a smart TV, a smart speaker, a wearable smart device, a personal computer (PC), and other devices. The terminal may alternatively include a client, and the client may be a video client, a browser client, or an instant messaging client. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

Figure 14:
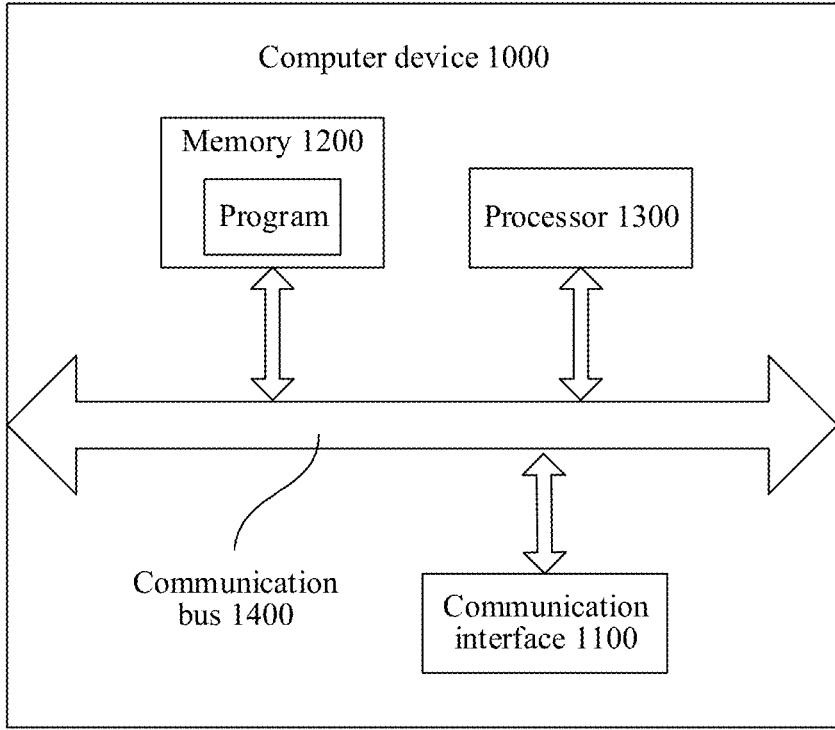
FIG. 14 is a schematic structural diagram of another computer device according to an embodiment of this disclosure.

FIG. 14 is a schematic structural diagram of a computer device 1000 according to an embodiment of this disclosure. As shown in the figure, the computer device 1000 may include: a communication interface 1100, a memory 1200, a processor 1300, and a communication bus 1400. The communication interface 1100, the memory 1200, and the processor 1300 implement communication with each other by using the communication bus 1400. The communication interface 1100 is configured for the computer device 900 to perform data communication with an external device. The memory 1200 may be configured to store a software program and a module, and the processor 1300 runs the software program and the module stored in the memory 1200, for example, a software program for a corresponding operation in the foregoing method embodiments.

If the computer device 1000 is an encoding device, the processor 1300 may invoke the software program and the module stored in the memory 1200 to perform the following operations:

determining a positional relationship between a current coding block and a reference coding block;

determining, when the positional relationship is overlapping, that the current coding block is a merged block;

partitioning the merged block to obtain a plurality of target coding blocks, the plurality of target coding blocks including same motion information;

obtaining, according to block vector information of the plurality of target coding blocks and an intra block copy prediction mode, a predictive value of the current coding block from the current image; and determining, according to the predictive value, a reconstruction value of the current coding block.

If the computer device 1000 is a decoding device, the processor 1300 may invoke the software program and the module stored in the memory 1200 to perform the following operations:

receiving an encoded video bit stream including a current image;

determining, according to the bit stream, a positional relationship between a current coding block and a reference coding block;

determining, when the positional relationship is overlapping, that the current coding block is a merged block;

partitioning the merged block to obtain a plurality of target coding blocks, the plurality of target coding blocks including same motion information;

obtaining, according to block vector information of the plurality of target coding blocks and an intra block copy prediction mode, a predictive value of the current coding block from the current image; and determining, according to the predictive value, a reconstruction value of the current coding block, and decoding the reconstruction value to obtain a decoded video bit stream.

The computer device 1000 may be a terminal or a server. The terminal may be a smartphone, a tablet computer, a laptop computer, a smart TV, a smart speaker, a wearable smart device, a personal computer, and other devices. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform.

In an embodiment, this disclosure further provides a computer device, including a memory and a processor, the memory storing a computer program, and the processor, when executing the computer program, performing the steps in the foregoing method embodiments.

This disclosure further provides a non-transitory computer-readable storage medium, configured to store a computer program. The computer-readable storage medium may be applied to a computer device, and the computer program enables the computer device to perform corresponding procedures in the coding block processing method in the embodiments of this disclosure. For brevity, details are not described herein again.

This disclosure further provides a computer program product, the computer program product including computer instructions, the computer instructions being stored in a computer-readable storage medium. A processor of a computer device reads the computer instructions from the computer-readable storage medium, and executes the computer instructions, to enable the computer device to perform corresponding procedures in the coding block processing method in the embodiments of this disclosure. For brevity, details are not described herein again.

This disclosure further provides a computer program, the computer program including computer instructions, and the computer instructions being stored in a computer-readable storage medium. A processor of a computer device reads the computer instructions from the computer-readable storage medium, and executes the computer instructions, to enable the computer device to perform corresponding procedures in the coding block processing method in the embodiments of this disclosure. For brevity, details are not described herein again.

When the functions are implemented in a form of a software functional unit and sold or used as an independent product, the functions may be stored in a computer-readable storage medium. Based on such an understanding, the technical solutions of this disclosure essentially, or the part contributing to the related technology, or a part of the technical solutions may be implemented in a form of a software product. The computer software product is stored in a storage medium, and includes several instructions for instructing a computer device (may be a personal computer, or a server) to perform all or a part of the steps of the methods described in embodiments of this disclosure. The foregoing storage medium includes: any medium that can store program code, such as a USB flash drive, a removable hard disk, a ROM, a RAM, a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A coding block processing method, comprising:

determining, according to a bit stream, that a current coding block is coded in an intra block copy mode;

determining, according to the bit stream, whether the current coding block overlaps a reference coding block, the current coding block having a height value b_h and a width value b_w, a block vector of the current coding block indicating the reference coding block;

when the current coding block is determined to overlap the reference coding block, determining that the current coding block is a merged block; and partitioning, according to a preset basic partitioning unit having a height value part_h and a width value part_w, the merged block into plural sub-blocks; and determining motion information of the plural sub-blocks based on one set of motion information indicated in the bit stream, such that the plural sub-blocks have the same motion information, wherein when (i) a y coordinate value of the block vector is less than or equal to −part_h or (ii) an x coordinate value of the block vector is less than or equal to −part_w, the current coding block is partitioned along only one direction, the only one direction being one of an x coordinate and a y coordinate of the current coding block, and the current coding block is not partitioned along another one of the x coordinate and the y coordinate of the current coding block.

2. The method according to claim 1, wherein the determining, according to the bit stream, whether the current coding block overlaps the reference coding block comprises:

determining, according to the bit stream, the block vector of the current coding block;

obtaining, according to the block vector, first positional information of the reference coding block; and determining, according to the first positional information and the current coding block, that the current coding block overlaps the reference coding block.

3. The method according to claim 2, wherein the determining, according to the first positional information and the current coding block, that the current coding block overlaps the reference coding block comprises:

obtaining second positional information of the current coding block; and determining that the current coding block overlaps the reference coding block when a horizontal coordinate of a lower right corner in the first positional information is greater than or equal to a horizontal coordinate of an upper left corner in the second positional information, and a vertical coordinate of the lower right corner in the first positional information is greater than or equal to a vertical coordinate of the upper left corner in the second positional information.

4. The method according to claim 1, wherein the partitioning, according to the preset basic partitioning unit, the merged block comprises:

obtaining the preset basic partitioning unit; and comparing the preset basic partitioning unit with the block vector of the current coding block, and determining, according to a comparison result, a target partitioning unit; and the partitioning includes partitioning, according to the target partitioning unit, the merged block to obtain the plural sub-blocks, a height of the target partitioning unit being one of b_h and part_h, and a width of the target partitioning unit being one of b_w and part_w.

5. The method according to claim 4, wherein when the y coordinate value of the block vector is less than or equal to −part_h, the current coding block is partitioned along the only one direction that is the y coordinate of the current coding block, the width value b_w of the current coding block is used as the width of the target partitioning unit on the x coordinate of the current coding block, and the height value part_h of the preset basic partitioning unit is used as the height of the target partitioning unit on the y coordinate of the current coding block, one or more of the plural sub-blocks having a size of (b_w, part_h); and when the y coordinate value of the block vector is greater than −part_h, the width value part_w of the preset basic partitioning unit is used as the width value of the target partitioning unit on the x coordinate of the current coding block, and the height value part_h of the preset basic partitioning unit is used as the height value of the target partitioning unit on the y coordinate of the current coding block, one or more of the plural sub-blocks having a size of (part_w, part_h).

6. The method according to claim 4, wherein when the y coordinate value of the block vector is greater than −part_h, the width value part_w of the preset basic partitioning unit is used as the width value of the target partitioning unit on the x coordinate of the current coding block, and the height value b_h of the current coding block is used as the height value of the target partitioning unit on the y coordinate of the current coding block, one or more of the plural sub-blocks having a size of (part_w, b_h).

7. The method according to claim 4, wherein when the x coordinate value of the block vector is less than or equal to −part_w, the current coding block is partitioned along the only one direction that is the x coordinate of the current coding block, the width value part_w of the preset basic partitioning unit is used as a width of the target partitioning unit on the x coordinate of the current coding block, and the height value b_h of the current coding block is used as the height of the target partitioning unit on the y coordinate of the current coding block, one or more of the plural sub-blocks having a size of (part_w, b_h); and when the x coordinate value of the block vector is greater than −part_w, the width value part_w of the preset basic partitioning unit is used as the width value of the target partitioning unit on the x coordinate of the current coding block, and the height value part_h of the preset basic partitioning unit is used as the height value of the target partitioning unit on the y coordinate of the current coding block, one or more of the plural sub-blocks having a size of (part_w, part_h).

8. The method according to claim 4, wherein when the x coordinate value of the block vector is greater than −part_w, the width value b_w of the current coding block is used as the width value of the target partitioning unit on the x coordinate of the current coding block, and the height value part_h of the preset basic partitioning unit is used as the height value of the target partitioning unit on the y coordinate of the current coding block, one or more of the plural sub-blocks having a size of (b_w, part_h).

9. A video decoding method, comprising:

receiving an encoded video bit stream comprising a current image;

determining, according to the encoded video bit stream, that a current coding block is coded in an intra block copy prediction mode;

determining, according to the encoded video bit stream, whether the current coding block overlaps a reference coding block, the current coding block having a height value b_h and a width value b_w, a block vector of the current coding block indicating the reference coding block;

when the current coding block is determined to overlap
the reference coding block,
determining that the current coding block is a merged
block; and
partitioning, according to a preset basic partitioning
unit having a height value part_h and a width value
part_w, the merged block into plural sub-blocks;
determining motion information of the plural sub-blocks
based on one set of motion information indicated in the
encoded video bit stream, such that the plural sub-
blocks have same block vector information;
obtaining, according to the block vector information of
the plural sub-blocks and the intra block copy predic-
tion mode, a predictive value of the current coding
block from the current image; and
determining, according to the predictive value, a recon-
structed value of the current coding block, and decod-
ing the reconstructed value to obtain a decoded video
bit stream, wherein
when (i) a y coordinate value of the block vector is less
than or equal to −part_h or (ii) an x coordinate value of
the block vector is less than or equal to −part_w,
the current coding block is partitioned along only one
direction, the only one direction being one of an x
coordinate and a y coordinate of the current coding
block, and
the current coding block is not partitioned along
another one of the x coordinate and the y coordinate
of the current coding block.
10. The method according to claim 9, further comprising:
determining, according to the encoded video bit stream, a
sequence header flag; and
the determining, according to the encoded video bit
stream, whether the current coding block overlaps the
reference coding block comprises:
when a flag value of the sequence header flag is a
predetermined value, determining that the current
coding block overlaps the reference coding block,
wherein the flag value of the sequence header flag
indicates that an encoder side performs encoding.
11. The method according to claim 9, further comprising:
when the current coding block is the merged block,
adjusting a residual coefficient corresponding to the
current coding block to 0.
12. The method according to claim 9, wherein the deter-
mining, according to the encoded video bit stream, whether
the current coding block overlaps the reference coding block
comprises:
determining, according to the encoded video bit stream,
the block vector of the current coding block;
obtaining, according to the block vector, first positional
information of the reference coding block; and
determining, according to the first positional information
and the current coding block, that the current coding
block overlaps the reference coding block.
13. A coding block processing apparatus, comprising:
processing circuitry configured to
determine, according to a bit stream, that a current
coding block is coded in an intra block copy predic-
tion mode;
determine, according to the bit stream, whether the
current coding block overlaps a reference coding
block, the current coding block having a height value
b_h and a width value b_w, a block vector of the
current coding block indicating the reference coding
block;

when the current coding block is determined to overlap
the reference coding block,
determine that the current coding block is a merged
block; and
partition, according to a preset basic partitioning unit
having a height value part_h and a width value
part_w, the merged block into plural sub-blocks;
and
determine motion information of the plural sub-blocks
based on one set of motion information indicated in the
bit stream, such that the plural sub-blocks have the
same motion information, wherein
when (i) a y coordinate value of the block vector is less
than or equal to −part_h or (ii) an x coordinate value of
the block vector is less than or equal to −part_w,
the current coding block is partitioned along only one
direction, the only one direction being one of an x
coordinate and a y coordinate of the current coding
block, and
the current coding block is not partitioned along
another one of the x coordinate and the y coordinate
of the current coding block.
14. The apparatus according to claim 13, wherein the
processing circuitry is further configured to:
determine, according to the bit stream, the block vector of
the current coding block;
obtain, according to the block vector, first positional
information of the reference coding block; and
determine, according to the first positional information
and the current coding block, that the current coding
block overlaps the reference coding block.
15. The apparatus according to claim 14, wherein the
processing circuitry is further configured to:
obtain second positional information of the current coding
block; and
determine that the current coding block overlaps the
reference coding block when a horizontal coordinate of
a lower right corner in the first positional information
is greater than or equal to a horizontal coordinate of an
upper left corner in the second positional information,
and a vertical coordinate of the lower right corner in the
first positional information is greater than or equal to a
vertical coordinate of the upper left corner in the
second positional information.
16. The apparatus according to claim 13, wherein the
processing circuitry is further configured to:
obtain the preset basic partitioning unit;
compare the preset basic partitioning unit with the block
vector of the current coding block, and determine,
according to a comparison result, a target partitioning
unit; and
partition, according to the target partitioning unit, the
merged block to obtain the plural sub-blocks, a height
of the target partitioning unit being one of b_h and
part_h, and a width of the target partitioning unit being
one of b_w and part_w.
17. The apparatus according to claim 16, wherein
when the y coordinate value of the block vector is less
than or equal to −part_h, the current coding block is
partitioned along the only one direction that is the y
coordinate of the current coding block, the width value
b_w of the current coding block is used as a width of
the target partitioning unit on the x coordinate of the
current coding block, and the height value part_h of the
preset basic partitioning unit is used as the height of the
target partitioning unit on the y coordinate of the current coding block, one or more of the plural sub-blocks having a size of (b_w, part_h); and when the y coordinate value of the block vector is greater than −part_h, the width value part_w of the preset basic partitioning unit is used as the width value of the target partitioning unit on the x coordinate of the current coding block, and the height value part_h of the preset basic partitioning unit is used as the height value of the target partitioning unit on the y coordinate of the current coding block, one or more of the plural sub-blocks having a size of (part_w, part_h).

18. The apparatus according to claim 16, wherein when the y coordinate value of the block vector is greater than −part_h, the width value part_w of the preset basic partitioning unit is used as the width value of the target partitioning unit on the x coordinate of the current coding block, and the height value b_h of the current coding block is used as the height value of the target partitioning unit on the y coordinate of the current coding block, one or more of the plural sub-blocks having a size of (part_w, b_h).

* * * * *